United States Statutory Invention Registration [19]

[11] Reg. Number: H188

Thomson et al. [43] Published: Jan. 6, 1987

[54] MONITOR FOR AIRBORNE DUSTS

[75] Inventors: George M. Thomson; Sandra M. Thomson, both of Churchville, Md.

[73] Assignee: The United States of America as represented by the Secretary of the Army, Washington, D.C.

[21] Appl. No.: 825,424

[22] Filed: Feb. 3, 1986

[51] Int. Cl.[4] ..... G01N 23/223

[52] U.S. Cl. ..... 378/45; 378/44

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

An apparatus and method for detecting medium and high atomic weight elements includes a sampling mechanism for removing particles of an element to be detected from the aerosol and confining the particles to a selected geometry. The aerosol may, for example, be pumped through a filter with the particles being confined on a defined area of the filter. The selected geometry is then irradiated with x-rays to cause the particles to fluoresce and produce secondary x-rays. The secondary x-rays are detected and analyzed using criteria which determine the identity and concentration of the particles in the selected geometry. The air stream of the aerosol through the filter can be measured to determine the volume of aerosol from which the particles were removed as an aid in determining concentration.

19 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MONITOR FOR AIRBORNE DUSTS

STATEMENT OF GOVERNMENT INTEREST

The invention described herein may be manufactured, used, and licensed by or for the Government for Governmental purposes without the payment to us of any royalties.

FIELD AND BACKGROUND OF THE INVENTION

The present invention relates to the field of assessing the amount of certain types of particles in a volume of aerosol. Specifically, the invention rapidly senses and reports the concentration of elements having an atomic number greater than about 15, that are suspended in air as solid dust or droplets. The inventive device and method is able to detect various atomic species either singly or collectively regardless of their state of chemical combination. The application of this invention is intended to safeguard workers in industrial plants and to provide data for many types of process control.

The following approaches are used in testing air, but differ from the instant invention.

Gravimetric: The simplest quantitative approach to concentration determination consists of passing a given volume of air through a filter, capturing the transiting particles, and then measuring the filter's mass gain. In cases where the identity of the contaminant is either unimportant or is certain, this technique can be effective. One must however, be careful that extraneous contributors to the rather small mass gain, like water vapor, are very carefully controlled. This condition often precludes both rapid measurement and routine field use, thereby severely limiting gravimetric methods in application which are alarms.

Optical: Perhaps the most varied and widespread methods of particulate assessment use changes in the optical properties of the air itself or filters through which known volumes of air have passed. Some common forms of household smoke detectors look for changes in the optical transparency of an air column to indicate smoke. Other devices, used for testing the carburation of furnaces, collect the smoke on a filter and measure its blackening either by eye or by a photoelectric device. Both of these methods, although simple and rapid, are incapable of any identification of the contaminant. In cases where a harmful ingredient may be masked by the presence of large quantities of harmless smoke, identification is critical. One example of concern occurs often in soldering, wherein lead and cadmium particles from solders and brazing alloys frequently become aerosolized in a thick flux residue cloud. Such problems can be solved by directing a collimated beam of monochromatic ultraviolet or visible light through a vaporized sample of the particulates. As the wavelength of the light is varied it is absorbed according to a spectral pattern characteristic of each species present. The intensity of light at one or more wavelengths absorbed by a given compound is monitored and any decrease used to signal the presence of the compound. Another method, which is basically the inverse of optical absorption, incorporates vaporized particulates into an electrical discharge and studies the optical emission line pattern that results. Both absorption and emission techniques are extremely sensitive and are specific not only to the elemental species, but often even to its state of chemical combination. Unfortunately, both methods also usually involve intricate apparatus, very elaborate procedures, and difficulties in quantification that makes them unsuited for many field and/or automatic alarm uses.

Electrical: If a strong electric field acts on a small particle and if the particle is neutral, the field induces a net dipole moment on the particle. Any field gradients subject such aerosolized dipoles to a net force. The motion evoked under intense gradients adds to the Brownian motion of the particles and produces a net particle drift. This phenomena has long been used as a means to precipitate particles out of industrial aerosols. More recently electrical signals associated with recombination as the particles strike metal surfaces have been used both to herald particle arrival and also to acquire some information about their aerodynamic geometry.

The same functions of detection and aerodynamic characterization can also be performed in a straightforward manner in circumstances where the particulates can be given a net electrical charge. The required net charge may be added to particles either by triboelectric means or by a radioactive source. Once charged, the particle is admitted to a region of strong uniform electric field. The time required for the particle to traverse a given distance is next assessed and from it both the drift velocity and the aerodynamic size may be inferred. Neither electrical method provides direct composition information.

Ionization: Another type of aerosolized particle sensor, which in some ways is similar to the electrical types, is frequently used in household fire protection monitors. In it the detailed electrical behavior of the gas stream is observed as it undergoes bombardment with alpha particles from a radioactive source. Fast moving alpha particles ionize any media through which they pass, including air. If a particulate is introduced, a change in the ionization fraction occurs, a change that can be readily detected. This method is not only simple and inexpensive, but can be made quite sensitive. It provides neither geometrical information nor data on the chemical species present.

Chemical: Chemical means are most often applied to vapors and only occasionally used in particulate sensing. In most cases, one exposes samples of collected particles or the flow stream to chemical indicators that exhibit a pronounced physical change when the target material is present. The extent of that change is then measured and correlated with abundance. Depending upon the specific indicator used, one can sense either elemental materials, ions, specific compounds or entire classes of each. Chemical means are conceptually simple and usually sensitive. Unfortunately, however, chemical methods, like their optical counterparts, are limited to a narrow range of compounds, and often are based on physical effects that are difficult to make quantitative, such as color changes.

Special Methods: Many materials have a unique property, i.e. radioactivity, luminescence, or ferromagnetism, that may be exploited as an indicator. An example is airborne depleted uranium (DU) dust which is detected by scrutinizing collected samples for alpha particle emission arising from uranium's natural radioactivity. Such analysis is of course very slow and subject to the masking effects of naturally occurring radioisotopes.

Clearly then, improved means for aerosol detection which would avoid the above mentioned and other problems, would be worthwhile.

SUMMARY OF THE INVENTION

The present invention utilizes a microanalytical technique, x-ray fluorescence, in combination with automated sampling methods to provide a fast acting alarm for the prescence of certain aerosol dusts. It includes a sampler, an irradiator, a detector, and an analyzer/alarm. The sampler uses a mechanical pump, driven by an electric motor, to move a stream of air from the test region through a moveable filter paper tape. The paper removes particles from the stream and fixes them onto its own surface. Exposed tape is then indexed into the flux of an x-ray producing radioactive source; upon impact of the x-rays, the particles' atoms fluoresce, emitting x-rays which are detected and analyzed for element identification and abundance. The latter can be directly correlated with the element's aerosol concentration.

The new method has several advantages over other considered means of assessment as listed below:

(a) The inventive method is virtually real-time. It gives results within minutes after sampling begins when concentrations are near the units' sensitivity limit. This delay can be reduced to as little as several seconds when doses are higher.

(b) The method is completely self-contained. All functions such as air sampling, concentration determination, and reporting are carried out in one unit, on-site, with minimum of operator intervention.

(c) The method is useful for many elemental species. It signals the presence of any element with atomic number $Z>15$, existing as a solid particle or liquid droplet.

(d) The method is insensitive to the state of chemical combination of the element scrutinized.

(e) The method has multiple species capability. The apparatus can be set up to simultaneously monitor one, two or several different elemental species either individually or collectively.

(f) The method is sensitive. Concentrations as low as a few micrograms of the chosen element per cubic meter of air are easily found in a few minutes. This corresponds to a sensitivity of parts per billion by weight.

(g) The method permits direct calibration for quantitative measurements of aerosol concentration.

Accordingly, an object of the present invention is to provide a method and an apparatus for practicing the method which accurately, reliably and simply detects the presence of medium and high atomic weight elements in an aerosol.

Other objects and advantages of the invention will become readily apparent to one skilled in the art from a reading of the following description and a viewing of the accompanying drawings in which:

DESCRIPTION OF THE PREFERRED EMBODIMENT

The present invention consists of four major assemblies; the sampler, the irradiator, the detector, and the analyzer/alarm.

Figure 1:
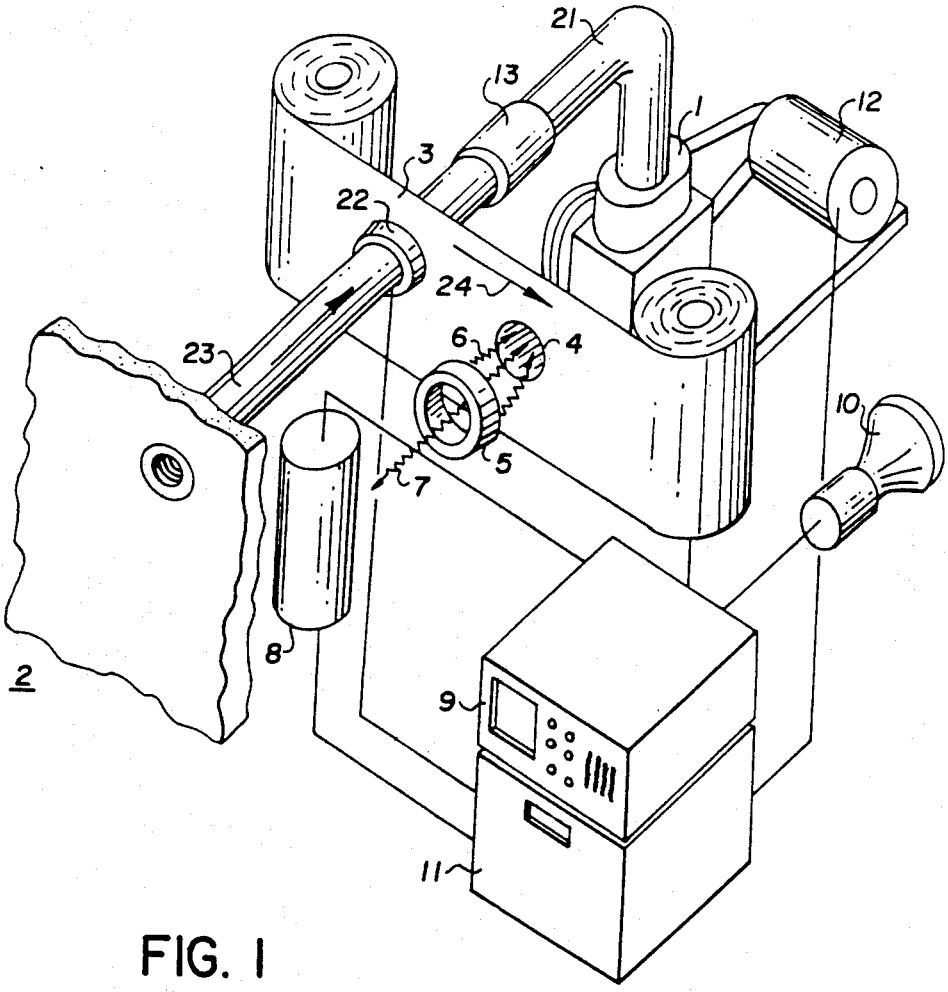
FIG. 1 is a schematic diagram of an embodiment of the invention.

An illustrative component configuration is presented in FIG. 1 and is the preferred embodiment of the invention for monitoring airborne dust. A sampler control 11 causes a mechanical pump 1 which is driven by an electric motor 12 to move a stream of air from the region to be tested 2 through a moveable tape of filter paper 3 that removes particles from the stream and fixes them on the paper's surface. The exposed tape 4 is then indexed into the flux of an x-ray producing radioactive source 5. Upon impact of the x-rays 6, the particles' atoms fluoresce, that is, they emit x-rays 7 of their own with energies characteristic of the elements they contain. Next, the emerging fluorescent x-rays are detected by means of an energy dispersive detector 8, analyzed for element identification by a single or multi-channel analyzer 9 and reported via a display device or alarm 10. The existence of fluorescent x-rays uniquely establishes the presence of the target element on the tape and their abundance is directly correlated with that element's aerosol concentration.

According to the present invention, one can monitor dusts containing most pure elements with atomic number $Z>15$ and/or their compounds at levels below that which are toxic. Most important perhaps, one usually gets the results in time to take appropriate action. A short description of each component and their interrelationships follows.

The Sampler: The function of this unit is to remove the particles from the air and concentrate them into a geometry which is most effective for detection. Means for carrying out sampling include electrostatic, thermal, inertial, gravitational, and filtration. For relatively thick aerosols (gms./cubic meter) concentration may not even be needed and the monitor may look at particles in the aerosol directly in the region under study. Filtration has proved most useful for the problem here undertaken and is discussed below. Alternatives, however, can also be envisioned and are included as part of the invention.

The filtration sample of the invention uses pump 1 to pass an airstream flowing at a given rate through a media (e.g. filter 3) which traps and retains on its surface particulates with physical sizes larger than specified value. Smaller particles and vapors pass through the media freely. The selection of a filter media, in this case a paper tape, rests upon several criteria. First, the retention size must be small enough to insure fixing of all particles of interest. Second, one must be certain that the impedance the media offers to the flow is not so high that flow is unnecessarily restricted. Third, the media must be radiologically transparent so that its scattered or fluoresced x-rays do not mask the fluorescence of the trapped particles. The third criteria implies that the material in the filter must be composed only of lighter elements, i.e. hydrogen, carbon, oxygen, and nitrogen. Finally, the media must enable time-resolved monitoring, that is, the deposit on it must be separated to reflect the time evolution of the aerosol concentration.

The filter media chosen for the inventive embodiment is a paper tape that fixes aerosolized particles which are smaller than those that carry the bulk of the mass of uranium aerosolized during DU anti-armor penetrator testing. It presents the minimum flow impedance and contains only low Z (atomic number) constituents. The invention uses spools of tape 66 meters long and 5 centimeters wide. Other varieties of filter paper tape could be used which combine trapping and impedance characteristics suited to specific problems such as small particle size or reactive environments. Use of a filter in tape form permits time resolution merely by moving the tape through the flow stream. Motion may be either incremental as exemplified in this embodiment or continuous. While one tape segment gathers particles from the air stream, the preceding segment, at 4 in FIG. 1 for example, may undergo analysis.

The sampler mechanism, comprised of items 1, 11, 12, 13, 22, and 23, is a Technical Associates' SAAM-3 which was very extensively modified for the inventive purposes. The original unit was used for DU detection by alpha particle counting, but not for our x-ray uses. For this reason it possesses unique features which are either superfluous to the present invention or not suited to x-ray fluorescence use.

The first of the modifications involves changing the ways in which control and timing for the sampling function is provided. The SAAM-3 operates on a fixed 30 minute interval during which it starts pump 1 and thus pulls air through the tape while simultaneously sensing alpha emission from the preceding sample. For the invention the unit has instead been equipped with digital circuitry which bases the sequencing of the system upon the counting of electrical pulses originating from either a digital clock or the x-ray detector 8. After the circuitry counts a predetermined number of counts of the desired type, the apparatus stops the drawing air through the tape 3, reports the number of fluorescent x-ray photons 7 detected in the preceding sample, moves the tape 3 to a new position, resets all counters and clocks, and finally, restarts the sequence. Counting clock pulses gives a fixed time interval between samples, while counting detector pulses provides a fixed fluorescence. The former has the advantage that the counts reported are directly correlated with the concentration. It is in marked contrast to fixed fluorescence sampling which at higher concentrations requires that the tape be indexed often and at lower concentrations leaves it fixed for long periods. Bearing in mind the single interval delay between sampling and counting, the fixed fluorescence mode can furnish efficient tape utilization and more uniform counting statistics.

The SAAM-3 has a long paper path between the sampling and counting location capable of accommodating about 48 samples. This introduces a delay of about 24 hours between sample deposition and analysis—a delay that is necessary to allow radioactivity from short-lived, natural(non-uranium) isotopes to decay away. Without it the uranium alpha decay would be masked. X-ray fluorescence, of course, does not require any waiting period and the lengthy paper path is eliminated. FIG. 1 shows the proximity between the detection site at 4 and the point where air is supplied to tape 3.

Further modifications were also needed at the point where the tape meets the air stream. At that location the unit has two tape retainers that straddle the filter tape. One is fixed and is connected to the pump via a hose 21. The other at 22 is movable and is connected to the region to be sampled by another hose 23. When the retainers close together the paper tape is held firmly and sealed so the air flows directly through it. In the other case, when the retainers separate, the paper tape is able to move freely and can be indexed in the direction of arrow 24. The seal the retainers affect is made with a soft circular foam plastic gasket. The same seal also defines the area of the tape 4 exposed to the air stream. In the invention the area is reduced to 4 sq. cm., half that of the SAAM-3, and the seals were improved. Flows through the area are adjustable from 0.03 to 0.10 cubic meters per minute.

The irradiator: Once deposition of the sample upon the filter paper tape is complete, the tape is advanced bringing the exposed region 4 directly in front of an x-ray producing radioactive source 5. The radioactive material employed in the invention, the isotope cadmium-109, is distributed in an annulus whose axis is oriented perpendicular to the plane of the filter paper tape 3 and is directed along the line that extends from the sample to the entrance window of the x-ray detector 8. The surface of the radioactive source facing the sample lies under a thin electroplated layer of metal that allows x-rays to emerge freely from the decaying nuclei underneath, but is thick enough to seal the source against any leakage of the source material itself. The side toward the detector 8, on the other hand, is heavily blanketed with layers of tungsten, lead, and aluminum so that x-rays from the source cannot strike the detector directly. This geometry permits source x-rays 6 to impinge upon the sample and the resulting fluorescence 7 to be observed by the detector 8 with a minimum of extraneous signals and efficient solid angles.

Selection of the isotope and strength of the irradiator is dictated by the target species and its concentration. The absorption of the source x-rays in the sample is dominated by photoionization. Because photoionization is most likely when the energy of the incident photon is just large enough to ionize the sample's atoms, an efficient source should produce photons near that energy. It is also important that the source be free of other radiations whose byproducts may mask weak fluorescence. The latter consideration is usually best satisfied with electron capture isotopes, that is, isotopes in which a K shell electron is directly captured into the nucleus. Capture creates a vacancy that is sometimes filled by an electron transition which emits an x-ray photon with an energy characteristic of the element of atomic number one less than the parent isotope. Among the most well-known capture isotopes are iron-55 and cadmium-109. These produce x-rays at 5.9–6.2 keV and 22–25 keV respectively.

Considering the problem of sensing collected uranium dust, an electron bound in the 2s shell of uranium requires at least 21.7 keV for ionization, while the two multiplets of the 2p shell require 20.9 and 17.2 keV. Since all are close to but smaller than the characteristic lines of Cd-109, that isotope represents a good choice of irradiator. This same isotope can also serve as an irradiator with varying degrees of efficiency for a wide range of other elements. The source 5 incorporated into the inventive device was a 25 millicurie Cd-109 source which is prepackaged in an annular shielded assembly that is used as an exciter for induced x-ray fluorescence work.

When dealing with any radioactive material one must, of course, exercise due caution. Cd-109's primary 22 keV radiation does not effectively penetrate sheet steel greater than ⅛" thick. It is thus easily shielded. A very small fraction of the Cd-109 atoms decay via a second mode producing an 88 keV x-ray. Their effect usually can be ignored.

It must be kept in mind that the population of radionuclides in a source always decays away. If the half-life is as long as that of americium 241, a frequently used source of energetic x-rays (433 years), one is well justified in ignoring any source decay. However, if the half life is comparable to the operational lifetime of the dust detector, then it must be carefully taken into account. Cd-109 has half life T=453 days—a value that certainly should be considered to be comparable. At time t after calibration takes place the initial source activity, A, will be reduced to a new value, a, according to the relation;

$$a(t)=A\exp(-0.693t/T) \quad (1)$$

and the results the apparatus reports will have to be adjusted appropriately.

The Detector: A detecting element 8 in the present system must both signal the arrival of a fluorescent x-ray 7 and also convey information on its energy. There are several different kinds of devices that can perform this task. The two most useful in the present application are solid state junction detectors and gas proportional counters. In both devices the incident photon is absorbed mainly by means of the photoelectric effect causing the absorbing atom to emit an electron with energy equal to that of the photon less the electron binding energy. For solid state detectors photoelectric conversion takes place in a semiconductor that forms one element of a reversed biased junction. Conversion in proportional counters occurs in a gas which surrounds a thin metal wire that is maintained at a few kilovolt positive potential. In both cases the conversion electron carries away most of the photon's energy. The electron, in turn, loses its energy by electron-hole production in the semiconductor or ionization in the gas. Because of the electrical biases supplied, both result in charge being delivered to electrical circuits connected to the junction/wire. The amount of charge is proportional to the energy of the conversion electron and thus also is proportional to the energy of the x-ray photon.

The semiconductor has the advantage that very small amounts of energy are required to create an electron-hole pair (usually 2–3 eV). A single x-ray photon at the energies of interest in the inventive device makes hundreds of pairs. The photon's energy is thus statistically well-determined by the resulting charge delivered to the external circuitry. Such statistical certainty allows easily measurable differences to be observed between photons that are closely spaced in energy. Unfortunately this has a price: the most often used semiconductors, such as lithium drifted silicon, require refrigeration to liquid nitrogen temperatures to work. Recently, semiconducting junctions have been developed that use high purity germanium or mercury-arsenic which are capable of functioning at room temperatures, albeit with lower resolution. Semiconductor devices are usually quite expensive, are often fragile, and lose resolution when manufactured in sizes larger than a few millimeters in diameter.

Gas proportional counters are simple, rugged, reliable, room temperature devices that are both inexpensive and lend themselves to field applications. However, since the energy required to cause ionization in a gas is ten times that needed for electron-hole production in a semiconductor, their resolution is comparatively poor. Proportional counters do possess an extremely useful feature, electrical gain. As the ions and free electron resulting from the impact of conversion electron separate, they often collide with gas atoms, ionizing them in turn. In the intense electric field near the wire the multiplication process continues to the point that hundred or even thousand fold gains are observed and substantial, easily-measured charges are delivered to the wire. One must be careful at high gains to insure that the gas does not break down electrically and saturate the counter output.

The present device employs a gas proportional counter that is filled with a mixture of 97% xenon and 3% carbon dioxide. The counter is a cylindrical tube 5 cm in diameter and 16 cm long with a 0.002 cm metal wire running along its axis. Midway along its length the tube has a 2.5 cm hole drilled in its wall that is covered with 0.025 thick cm beryllium window. The window admits x-rays into the gas region and keeps air outside. The large energy differences between the fluorescent x-rays of uranium, similar x-rays from other dusts in the firing range (mostly iron and tungsten), and the Cd-109 x-rays relaxes resolution requirements enough to permit gas counter use. Other potential applications involving multiple materials that have close atomic numbers or which happen to have close match between one elements' K lines and another's L lines, need a semiconductor's resolution.

The analyzer: Regardless of which type of detector is used, the charge pulse must next be amplified and shaped for subsequent analysis. The electronic units employed for this purpose are nuclear instrument modules (NIM). The first element in that array is a charge sensitive preamplifier which accepts the charge pulse from the detector and triggers a fast rise (< a few microseconds)—slow fall (>50 microseconds) voltage pulse whose amplitude is very precisely proportional to the collected charge/x-ray energy. The preamplifier's voltage output pulse is impedance coupled to drive a long coaxial cable—a feature that permits one to maintain large separations between the sampling/detecting equipment and the analyzing/reporting electronics. Next the pulse is routed to a multichannel analyzer 9 which then amplifies and reshapes the pulse with circuitry designed to achieve optimum combinations of count rate capability and amplitude resolution in the presence of noise. The same multi-channel analyzer unit also measures the amplitude of each pulse, sorts them precisely according to that value, and finally records each as a count in a channel that is of proportional magnitude. By accumulating many pulses over a period of time the analyzer 9 is able to develop a spectrum in which the channel number is directly proportional to the x-ray energy and the counts in that channel are directly related to the abundance of x-rays of the corresponding energy. If the number of counts in a group of channels is larger than a specified value, indicating a dangerous concentration of dust, the analyzer 9 may trigger alarm 10.

Figure 2:
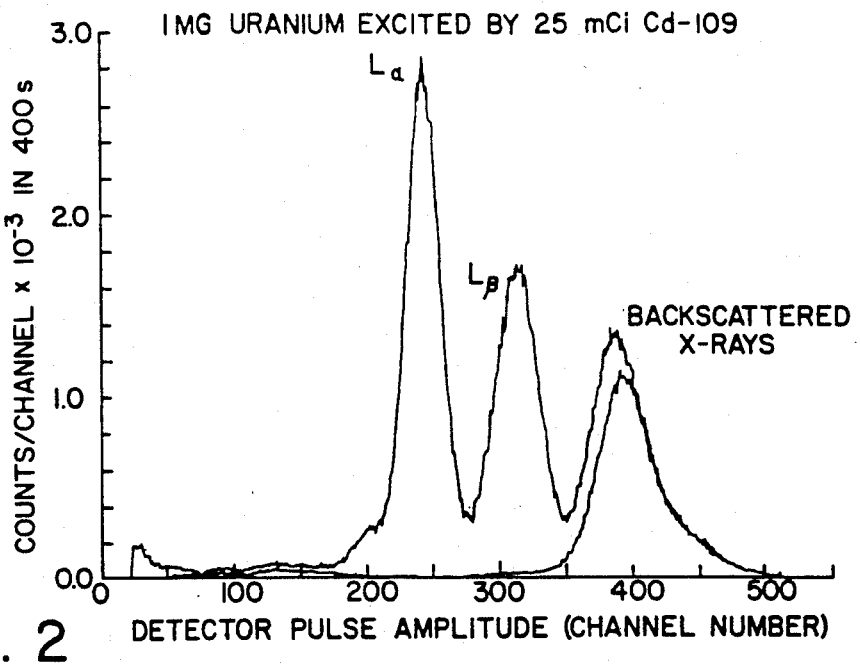
FIG. 2 is a multichannel analyzer spectrum illustrating the emission of x-rays from 1 milligram of uranium oxide that is fluorescing under bombardment by photons from a Cd-109 source.

An example of a spectrum appears in the upper curve of FIG. 2. It came from a 1 mg sample of depleted uranium fluorescing under exciting x-rays from a Cd-109 source. The data were taken with an xenon-carbon dioxide proportional counter. The peak on the right is due to source x-rays that have scattered from air, from the filter paper tape, or from the sample itself. The two other peaks are fluorescent uranium x-rays from two multiplets in the L series. It is sufficient to restrict one's attention to only one of the spectral lines (the lowest is best in this case) and sum the number of counts contained within the channels lying underneath the corresponding peak. Almost all multi-channel analyzers have built-in circuitry to perform this summing automatically. Any counts in that region caused by air and filter scattering may be estimated by repeating the measurement without exposing the paper to the DU dust bearing air stream. The background measurement appropriate to the test case above is depicted in the lower of the two curves of FIG. 2. If the summed background counts underneath the spectral region defined by the selected line is subtracted from the corresponding sum due to the exposed sample, then one derives a number that is proportional in most cases to the abundance of the element in question. It is this number that forms the essential input for the inventive concentration determination. The exceptions come about when the deposit on the tape is very heavy and the abundance of the element in question is small. X-ray scattering off the deposit can then induce a significant discrepancy. Such conditions are flagged by a large difference between the areas under the scattered peaks in the exposed and unexposed spectra. Scattering's contribution to the sum can be estimated by interpolating counts in the strattling off-peak regions across the peak of interest. Another problem associated with heavy deposits is self-absorption of x-rays (especially the less energetic ones) within the deposit itself. One may test for self-absorption by checking for a non-linear relationship between sampling time and x-ray yield. In many cases its ill effects may be eliminated by reducing the sampling time. Given that the aforementioned situations do not exist, the next task is to relate the difference in counts under the selected line, N, to the element in question's concentration in the sampled air, C. The relationship between the characteristics of the apparatus and the concentration is:

$$C=KN/VEat \quad (2)$$

where V is the volume of air passed through the sampler during the user chosen sampling/counting time interval, t; E is the system trapping efficiency, the fraction of the particles entering the inlet that end up stuck to the surface of the collecting tape; a is the source activity and K is the sensitivity. The latter quantity relates the mass of the sought for element deposited on the filter tape to the counts found in the selected spectral region during a unit time as normalized to a standard source activity. The sensitivity takes into account the source-target-detector geometry, the detection efficiency, and the overall inner shell ionization/fluorescence physics.

The volume of sampled air is determined by means of a flowmeter 13 placed in the flow stream on hose 21 between the tape 3 and the pump 1. For cases of low particulate concentration, the volume is just the product of the flow rate and the time of sampling. However, if the dust concentration is high, the filter may become rapidly clogged and the flow rate may be reduced appreciably. This difficulty can be overcome in some cases by reducing the sampling time. When it cannot, one must incorporate integrating instrumentation.

Assessment of the trapping efficiency is an even more complex task which must be evaluated for each individual operating situation. Three specific concerns must be addressed. First, are those particles drawn into the inlet representative of the aerosol? Second, are any particles captured in the flow lines? Third, does the filter material collect all particles of interest? The first problem can be resolved by direct comparision of results with other sampling methods operating on the same target aerosol. For the second concern, an examination of the various flow path components is relied on for evidence of accumulation. The third can be resolved by examining the flow stream exiting the tape for any signs of particulate penetration.

Figure 3:
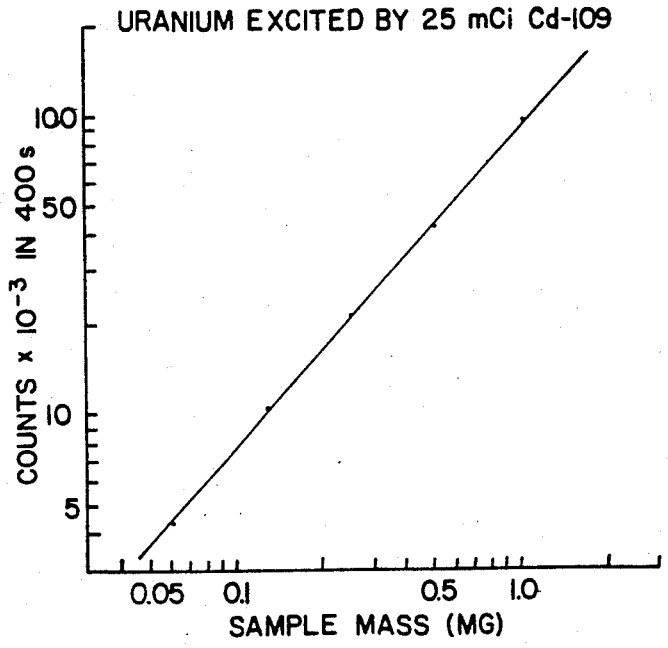
FIG. 3 shows the results of measurements in which calibration samples of uranium on filter tape were excited by a Cd-109 source; the data points showing the sample mass vs. the counts accumulated under the peak corresponding to the lowest energy fluorescent L x-ray less background and the curve being least squares linear fit to the data.

Determination of the sensitivity of the apparatus K is a relatively straight forward problem. It is accomplished by carefully preparing filter tape sections with a known amount of the elemental species in question deposited in a geometry which is as close as possible to that laid down by the sampler. The calibration sample is then counted by fluorescence for a given period of time. Results of this type are presented in FIG. 3 for samples spanning the range of interest in depleted uranium projectile testing at an enclosed firing range. To prepare each sample an exact volume of a standardized uranium oxide—nitric acid aqueous solution was micropipetted very evenly over a region identical in size (2.54 cm. dia.) to the sampler's active deposition region 4. The samples were then dried and counted. Self-absorption in DU was negligible and the results were consistent when the samples were recounted or replaced with new ones. The same method is being applied successfully to iron, and on the several other elements which have been effectively detected with the system. Among these are zinc, mercury, tungsten, lead, copper, nickel and chromium.

The unit described has been tested on DU dusts at an indoor firing range at the US Army Ballistic Research Laboratory. It demonstrated the ability to detect and report dusts at levels of about 6 micrograms per cubic meter in sampling times of about 3 minutes with 2:1 signal to background ratio (S/N). The accepted maximum concentration for long term worker exposure to DU dust is 200 micrograms per cubic meter. For the case of iron, a series of tests were carried out in chambers at the U.S. Army Chemical Research & Development Center. The limit of detectability at a S/N ratio of 2:1 was about 20 micrograms per cubic meter, a value far less than the accepted exposure limit—5000 micrograms per cubic meter. Clearly, in the two cases cited the monitor proved very effective. There can be little doubt that it can perform equally well on many other elements.

The invention has been used to detect aerosolized DU in a firing range. It was quite successful as previously noted. The DU tests were followed by a second test series using iron-bearing aerosols with similar success.

A key hurdle in the development of the inventive apparatus was the making of accurate standards for calibration. Methods noted above for constructing suitable standards based upon micropipetting of precisely formulated solutions into accurate circular patterns have been devised. Their introduction made the present invention truly quantitative and able to be certified for personnel protection uses.

While a specific embodiment of the invention has been shown and described in detail to illustrate the application of the principles of the invention, it will be understood that the invention may be embodied otherwise without departing from such principles.

What is claimed is:

1. A method of detecting the presence of medium to heavy elements in an aerosol comprising:

irradiating a selected geometry which contains an amount of particles of at least one element to be detected using x-rays for fluorescing the quantity of particles so that they produce secondary x-rays;

detecting the secondary x-rays to produce detection signals; and analyzing the detection signals using criteria for establishing the identity and concentration of the irradiated particles.

2. A method according to claim 1, including removing the amount of particles from the aerosol and concentrating the amount of particles at the selected geometry.

3. A method according to claim 2, including pumping the aerosol through a filter at an area of the filter which forms the selected geometry to filter out the amount of particles from the aerosol so as to remove the amount of particles from the aerosol.

4. A method according to claim 3, including using filter tape as the filter and moving the filter tape from a first location at which the amounts of particles were removed and concentrated, to a second location, irradiation of the particles taking place at the second location.

5. A method according to claim 4, wherein the area of the filter forming the selected geometry comprises a circular area, and including irradiating the circular area at the second location using an annular source of x-rays having an aperture therein through which the secondary x-rays pass.

6. A method according to claim 4, including utilizing a radioactive isotope which emits x-rays for irradiating the particles and selecting the isotopes so that it has an irradiating energy which is only slightly greater than that which is necessary for ionizing atoms of the particles to produce the secondary x-rays.

7. A method according to claim 4, including moving the filter tape at timed intervals having selected period which is long enough for completing the analyzing of the detector signals so as to form a plurality of areas having concentrated particles which are each analyzed.

8. A method according to claim 7, including measuring a volume of aerosol passed through the filter and determining a concentration of the concentrated particles as a function of the volume and the period of the intervals.

9. A method according to claim 4, including using a detector for detecting the secondary x-ray which produces pulses as the detector signals, counting the pulses and, when the count reaches a selected value, moving the tape to a further location for removing a further amount of particles from the aerosol.

10. A method according to claim 9, including amplifying, shaping and catagorizing the pulses.

11. A device for detecting the presence of medium to heavy element in an aerosol comprising in combination:

sampler means for removing particles of at least one element to be detected from the aerosol and concentrating the particles into a selected geometry;

irradiating means for irradiating the selected geometry plus concentrated particles thereat to x-rays for fluorescing the concentrated particles so that they produce secondary x-rays;

detector means for detecting the secondary x-ray to produce detection signals; and analyzing means connected to said detector means for analyzing the detection signals using criteria for establishing the identity and concentration of the concentrated particles.

12. A device according to claim 11, wherein said sampler means comprises a sheet of filter material, an aerosol pump for pumping aerosol through a selected area on the filter material, the selected area forming the selected geometry, and means for moving the area to a new location for irradiation by said irradiator means.

13. A device according to claim 12, wherein said filter material comprises elongated filter tape which is moved by said means for moving the filter material in a direction parallel to its direction of elongation.

14. A device according to claim 13, wherein said sampler means includes a pair of tape retainers on opposite sides of the tape and defining the area corresponding to said selected geometry, a first hose connected from one of said tape retainers. to said pump for drawing aerosol from said tape and a second hose connected from the other of said retainers to a region from which aerosol is to drawn for detection.

15. A device according to claim 14, wherein said irradiator means comprises an annular source of radioactive material which generates x-rays, said annular source having an opening therethrough for the passage of the secondary x-rays, said retainers defining a circular area of said filter material which is to be irradiated by said source.

16. A device according to claim 15, wherein said detector comprises a gas proportional counter.

17. A device according to claim 15, wherein said detector comprises a semiconductor x-ray detector.

18. A device according to claim 12, wherein said detector means produces pulses as its detection signals, said sampler means including means for counting a selected number of pulses which is connected to said means for moving said filter material each time the selected number of pulses has been counted.

19. A device according to claim 12, wherein said irradiator means comprises a radioactive isotope which emits x-rays at an energy level which is slightly greater than an energy required to ionize atoms of the element to be detected.

* * * * *